US008995775B2

(12) United States Patent
Fung (10) Patent No.: US 8,995,775 B2
(45) Date of Patent: Mar. 31, 2015

(54) REDUCING PHOTO-TAGGING SPAM

(75) Inventor: Felix Fung, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 886 days.

(21) Appl. No.: 13/099,014

(22) Filed: May 2, 2011

(65) Prior Publication Data

US 2012/0281911 A1 Nov. 8, 2012

(51) Int. Cl.
*G06K 9/62* (2006.01)
*G06K 9/00* (2006.01)

(52) U.S. Cl.
CPC ................. *G06K 9/00677* (2013.01)
USPC ........... 382/224; 382/100; 382/115; 382/118; 382/229

(58) Field of Classification Search
None
See application file for complete search history.

(56) References Cited

U.S. PATENT DOCUMENTS

| | | | | |
|---|---|---|---|---|
| 2004/0128536 | A1* | 7/2004 | Elzam et al. | 713/201 |
| 2007/0150773 | A1* | 6/2007 | Srivastava | 714/49 |
| 2010/0316300 | A1* | 12/2010 | Epshtein et al. | 382/229 |
| 2012/0087548 | A1* | 4/2012 | Wu et al. | 382/115 |

OTHER PUBLICATIONS

Liu et al., "Filtering spam in social tagging system with dynamic behavior analysis." Jul. 2009, Social Netowrk Analysis and Mining, ASONAM'09, International Converence on Advances, IEEE, pp. 95-100.*
Sperotto, Anna, et al. "Detecting spam at the network level." The Internet of the Future. Springer Berlin Heidelberg, 2009. 208-216.*
Giannakidou, Eirini, Ioannis Kompatsiaris, and Athena Vakali. "Semsoc: Semantic, social and content-based clustering in multimedia collaborative tagging systems." Semantic Computing, 2008 IEEE International Conference on. IEEE, 2008.*

* cited by examiner

*Primary Examiner* — Daniel Mariam
*Assistant Examiner* — David Perlman
(74) *Attorney, Agent, or Firm* — Baker Botts L.L.P.

(57) ABSTRACT

A photo spam detector detects illegitimate non-natively captured images through extracting image features and feeding the extracted features into a probabilistic model. The probabilistic model categorizes the photo as legitimate or illegitimate. Requests to tag one or more users in a photo are analyzed by a tag analyzer that assesses relationships between the tag requests themselves, social relationships between the tagged users, and the presence or absence of faces within the regions specified by the tag requests. Based on the classification of images or tags as illegitimate, a social networking system applies one or more social media distribution policies to the image or tags to suppress or prohibit distribution.

9 Claims, 5 Drawing Sheets

REDUCING PHOTO-TAGGING SPAM

TECHNICAL FIELD

The present disclosure relates generally to social networking websites and other systems in which users can form connections with other users, and in particular, reducing malicious behavior or spam related to photos or other media hosted on the social network and the tagging thereof.

BACKGROUND

Social networks, or social utilities that track and enable connections between users (including people, businesses, and other entities), have become prevalent in recent years. In particular, social networking websites allow users to communicate information more efficiently. For example, a user may post contact information, background information, job information, hobbies, and/or other user-specific data to a location associated with the user on a social networking website. Other users can then review the posted data by browsing user profiles or searching for profiles including specific data. Social networking websites also allow users to associate themselves with other users, thus creating a web of connections among the users of social networking website. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep track of a users previous purchases and provide the user with information on related books during subsequent interactions with the system. Information in a user's profile may also be used by the system to target sponsored stories that are of interest to the user.

Users interacting with the social network may produce stories, either intentionally or by some activity, to a live activity stream, such as a "news feed." A news feed is a data format typically used for revealing new and topical content. A social networking system may segment the content of the live activity stream into various views possibly by specific subject matter or topic, and/or other users. Photos posted by the friends of a certain user, or photos tagged of a certain user by his or her friends may be a view of a the user's news feed. In addition, certain actions, such as being tagged in a photo, may, through the above means, be delivered to the user in the form of an event notification.

Certain malicious users or applications may distribute their content by uploading illegitimate photos, excessively tagging them, or tagging legitimate photos with false tags.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a social networking environment including a social networking system and related systems that integrate individual stories, status updates, and user interactions with an advertising system. A social networking system offers its users the ability to communicate and interact with other users of the social networking system. Users join the social networking system and then add connections to a number of other users to whom they desire to be connected. Once they are members of the social network, the users may interact with the social network itself, by posting stories and status messages on their own page, other users, by commenting, posting stories, etc. on other users' pages, or with non-user entities, such as fan pages that they subscribe to, online deals they redeem or subscribe to, or locations that they check in to.

In particular, users may post photos to the social network that are subsequently displayed on their friends' newsfeeds. Users may also tag their friends in photos, which appear as a notification to the tagged friend, as well as in the newsfeed of the tagged friend's friends. Some users may seek to leverage this mechanism to distribute social media through manual or automated tagging of images that are of low value to users of the social networking system. For example, a common tactic for "party promoters" is to upload an image of a party flyer and tag all their friends, either manually or through an automated script, regardless of whether their friends are included in the image. Such actions may be suppressed through rate limiting and other policy-based implementation. Implementations of the present disclosure extend these concepts by allowing the social networking system to extract features from the image and probabilistically calculate whether the image is a legitimate natively-captured image (such as one taken from a camera) or a illegitimate non-natively-captured image (such as generated by an application, an advertisement, or a flyer). Other embodiments are readily envisioned by the disclosure and are described in detail below.

Figure 1:
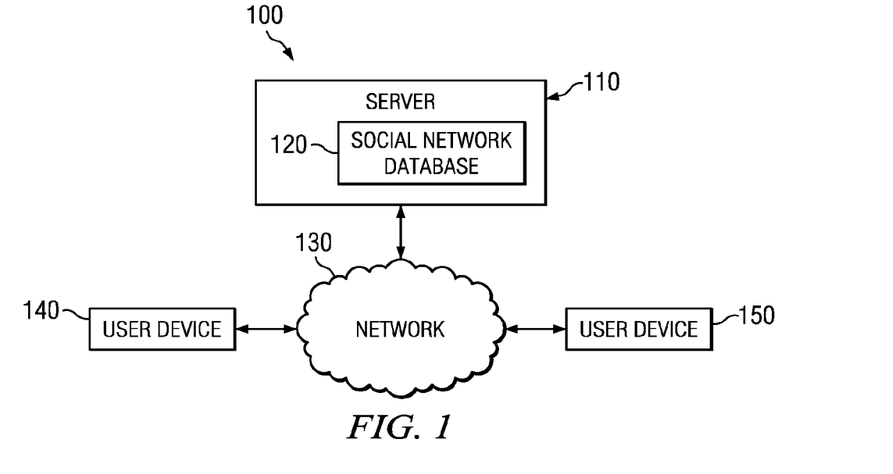
FIG. 1 illustrates the architecture of an example social network.

FIG. 1 illustrates an exemplary environment 100 in which a social network may exist and in which objectionable conduct may occur. Environment 100 comprises a server 110, a network 130, and user devices 140 and 150. A social network database 120 is located on the server 110. The server 110 monitors user activity and determines whether a predetermined policy is violated. The database 120 manages user information that is accessed by users of the social network. The server 110 and the database 120 are discussed further herein. The network 130 provides the medium for communication between the server 110 and user devices 140 and 150. The network 130 may be the Internet, a wireless or wired network such as a mobile device carrier network, or any other network that can be used for communication between a server and a client.

In one embodiment, the user device 140 is used by a user initiating the actions being monitored by the server 110. The user device 150 is used by a recipient of the monitored actions. User devices 140 and 150 may each be any suitable computing device, such as a mobile device, a mobile phone, a cell-phone, a smart-phone, a personal digital assistant, a notebook computer, a laptop computer or a hand-held game console.

Figure 2:
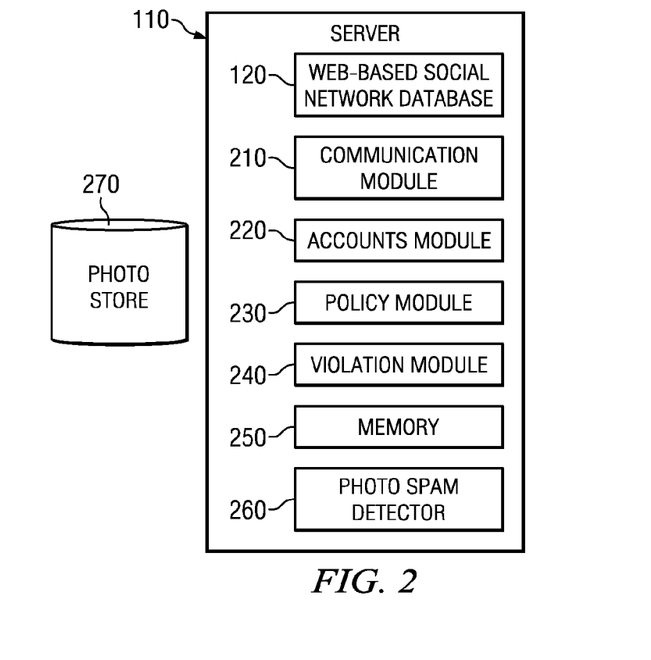
FIG. 2 illustrates an example architecture of a server that may be used in a social network.

FIG. 2 illustrates one embodiment of the architecture of a server 110 that may be used in a social network. The server 110 comprises the database 120, a communication module 210, an accounts module 220, a policy module 230, a violation module 240, and memory 250. Server 110 also includes a photo store 270 to which users may upload photos to, access photos in, or otherwise interact with photos stored therein via communication module 210.

The communication module 210 may be used to communicate with user devices 140 and 150. The accounts module 220 monitors and/or receives actions from user devices, such as user device 140. In particular embodiments, accounts module 220 also stores profile information for each particular user. Actions from user device 140 that affect other user devices, such as user device 150, are time-stamped and the type of action is recorded in memory 250.

The policy module 230 stores one or more policies which determine whether a user's actions are objectionable. A policy may be represented by a type of action or a combination of actions and a time dependent function. Such functions may be linear, exponential, polynomial, or step functions, functions of acceleration, i.e., a function of time squared, or any other function that can be used to measure user activity over time. In various embodiments, a representative curve of the policy threshold has an initial steep slope that gradually decreases over time. Particular embodiments of the disclosure pertain to classification or decision functions that map particular inputs with respect to time to a set of actions.

The policy may have different thresholds of violation for different degrees of the same type of action, e.g., a warning threshold which results in some warning to the offending user, and a suspension threshold which removes rights from the user. A suspension may be temporary, for example for hours, days, or months, or may require a system operator to reactivate a user's account prior to further actions. A suspension may help curtail spammers from abusing the social network. In various embodiments, the time of a temporary suspension is extended if a user attempts to repeat the type of action that resulted in suspension of the account.

The violation module 240 determines whether a user has violated the policy. The violation module 240 compares the number and type of actions recorded by the accounts module 220 with the policy stored in the policy module 230. Upon reaching a threshold, the violation module 240 may respond by requesting the communication module 210 to issue a warning to the user and/or by altering a user record in the database 120 to suspend the user's account.

The server 110 may include memory 250 to store applications or modules and other information. Photo spam detector 260 residing on server 110 includes instructions embodied in software code operable to detect illegitimate photos and illegitimate photo-tagging operations, and suppress the delivery of such photos or tags. Photo spam detector 260 is operably connected to photo store 270, and may access information stored in accounts module 220 and policy module 230. In some embodiments, applications, modules, and/or database 120 may reside in memory on several servers (not shown).

Figure 3:
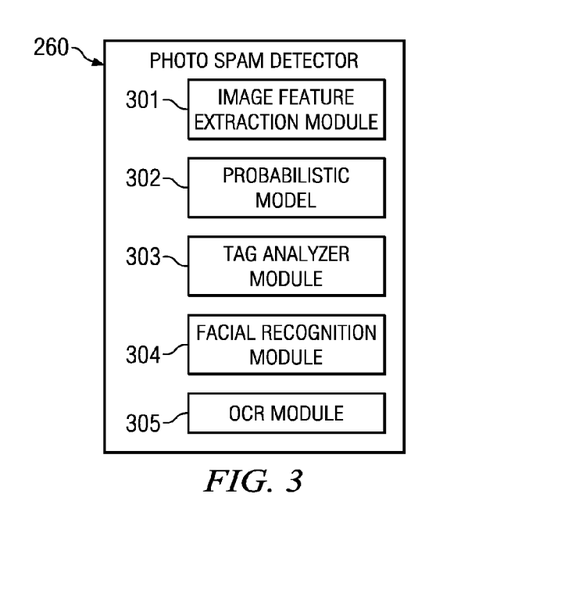
FIG. 3 illustrates example component modules of photo spam detector according to one embodiment.

FIG. 3 illustrates exemplary individual software modules within photo spam detector 260. Image feature extraction module 301 applies image processing algorithms or computer vision algorithms to extract features from a given image. Such features may include color distributions, histograms for one or more colors or gamma levels, the aspect ratio of the photo image, the compression ratio of the image, edge detection, texture detection, orientation, and the like. Methods of image feature extraction are well-known in the art and include but are not limited to frequency domain filtering, wavelet transforms, and converting the image to vector form (such as SVG). This disclosure contemplates any suitable method of image feature extraction.

The various features extracted by image feature extraction module 301 may give photo spam detector 260 insight as to whether the image in question is a legitimate natively-captured image or an illegitimate non-natively captured image. In particular embodiments, color histograms may provide useful insights. Images with large regions of unnatural colors, such as pure black or pure white, are less likely to be natively-captured images. These images, in particular embodiments, are much more likely to be computer-generated graphics like the example image of FIG. 4B. In particular embodiments, the color distribution lends insight into the legitimacy of the image. For example, even where a clever spammer may utilize a color gradient as a background, the linearity of the gradient along any given axis or distance may indicate that the image is illegitimate. Images with linear gradients are much less likely to be captured natively. In particular embodiments, edge detection may be utilized to score the legitimacy of the image. For example, natural images do not have clear, well defined outlines as line art does. Even where images possess clear outlines, such as for a black building against a blue sky, the edges are poorly aliased and differ significantly from computer generated images. In particular embodiments, higher compression ratios may indicate a lower probability of the image being legitimate. Natural photographs tend to compress poorly, whereas graphics with large unbroken regions of a solid color compress well. In particular embodiments, the aspect ratio may indicate whether an image is a legitimate natively-captured image. For example, cameras tend to have standard aspect ratios, such as 4:3 or 16:9. Images generated by applications may have different non-camera aspect ratios. Images having such ratios are far more likely to be illegitimate rather than natively captured.

In particular embodiments, photo spam detector 260 may also extract metadata, such as exchangeable image file format (EXIF) data from the image itself. This EXIF data is of little use in and of itself, because it is a relatively elementary task to fake EXIF data. However, the concurrence between the EXIF data and the image properties may be useful in determining the legitimacy of the image. In particular embodiments, discrepancies between the extracted image features and the EXIF data may indicate that the image is illegitimate. For example, if the aspect ratio or pixel dimensions indicated by the EXIF data differs from the actual uploaded image, the image is more likely to be illegitimate. Methods of verifying consistency between the EXIF data and image data are not limited to dimensions. In particular embodiments, specialized image feature extraction modules may extract particular features to verify against certain metadata. For example, photos show with low apertures, such as F/2 and below, should be blurry in one area and focused in another. Edge detection algorithms may be used to detect increased areas of aliasing to verify that one area is sharp and others are blurry. Conversely, photos taken with a high aperture, such as F/10 and above, should be essentially completely in focus. Increased aliasing in one area may indicate inconsistency between the EXIF aperture data and the actual image. This disclsoure contemplates any suitable algorithm or methodology for verifying concurrence between metadata and image characteristics.

Features extracted by image feature extraction module 301 are fed into probabilistic model 302. Probabilistic model 302 receives the extracted image features as inputs and, from those inputs, calculates a probability as to whether the image from which the features were extracted is a legitimate natively-captured image or an illegitimate image. Probabilistic model 302 may be any suitable type of machine learning application. In particular embodiments, probabilistic model 302 comprises a neural network. In particular embodiments, probabilistic model 302 is a support vector regression (SVR). When utilizing an SVR, an initial training set of any number of legitimate and illegitimate images may be fed into the machine, from which the machine learns what extracted features are more likely to be legitimate images or illegitimate images. In particular embodiments, the probabilistic model is a nonlinear classifier. In particular embodiments, the SVR may be multiclass. In particular embodiments, the training of the probabilistic model may be supervised or unsupervised. In particular embodiments, probabilistic model 302 may be subject to feedback from users. For example, users may flag images as illegitimate. When such an event occurs, it is added to the training set and probabilistic model 302 is updated. In particular embodiments, the probabilistic model creates one or more probability density functions (PDFs) that determine the probability an image is illegitimate for a given input feature. This disclosure contemplates any suitable machine learning algorithm or application for implementing probabilistic model 302.

Photo spam detector 260 in particular embodiments also includes OCR (optical character recognition) module 305. Illegitimate images often contain large blocks of text. In particular embodiments, OCR module 305 may search the image in question for large blocks of text, and flag the image as less likely to be legitimate based upon this detection. While the existence of text blocks in images is not dispositive of its legitimacy; for example, a legitimate natively-captured image may include captured text contained in real-life signage. However, in particular embodiments, the disparity of the signage from the rest of the image; i.e., sharply aliased, significantly different gamma value, placement, etc. may indicate that the image is illegitimate. This disclosure contemplates any manner of combining other extracted image features with optical character recognition to calculate the probability that an image containing blocks of text is illegitimate.

Photo spam detector 260 also includes tag analyzer module 303. Tag analyzer module may process any set of requests to tag a photo. In particular embodiments, tag analyzer module is run concurrently with image feature extraction module 301. In particular embodiments, it is run separately from image feature extraction module 301. Tag analyzer module 301 may access accounts module 220. In particular embodiments, tag analyzer module monitors the temporal rate that the tag requests are received. For example, if the tags are received substantially simultaneously, or under a predetermined threshold from each other, such as 3/10 of a second, it s likely that the tags are auto-generated by an application and constitute spam. In particular embodiments, tag analyzer module 301 analyzes the relationship between the users associated with the tags to determine the likelihood that the tags are spam. For example, if the tag requests are received in alphabetical order by username (either first or last), there is a high likelihood that the tags were automatically generated by an application or script, and constitute spam. In other embodiments, tag analyzer module 303 accesses social relationship information about the users associated with the tag requests from accounts module 220. Tag analyzer module may take into account coefficient scores between the set of users tagged. Coefficient scores may be calculated based on any number of variables. For example, increased interaction between any two users may result in a higher coefficient score, lending to the inference that the two are closer real-world friends. Similarly, a large number of mutual friends may increase the coefficient score. Methods for calculating coefficient scores between two or more users are well-known. Regardless of how the coefficient scores are calculated, once tag analyzer module 303 obtains coefficient scores between each of the set of tagged users, tag analyzer 303 may calculate the probability that the image is legitimate based on the coefficient scores. For example, a set of users with coefficient scores below a predetermined threshold, indicating that the users are not very close friends in real-life, are less likely to be tagged in the same photo. Thus the probability the tags are spam is increased.

In particular embodiments, photo spam detector 260 includes facial recognition module 304. Facial recognition module 304 applies one or more face recognition algorithms to detect the existence of faces in the image. Because requests to tag the photo delineate a bounded region of the photo, photo tags lacking a face with the region are more likely to be spam tags. In particular embodiments, facial recognition module 304 searches for a face within each region designated by each tag request submitted on an image. If no face is detected within the region, the tag request is more likely to be spam. In particular embodiments, facial recognition module 304 searches the region defined by each tag for a unique face. For example, a spammer may tag the same individual face multiple times. The requirement that each face be unique, or, at a minimum, not the exact face detected in another tag region, to be legitimate, accounts for this particular method of spamming.

Figure 4A:
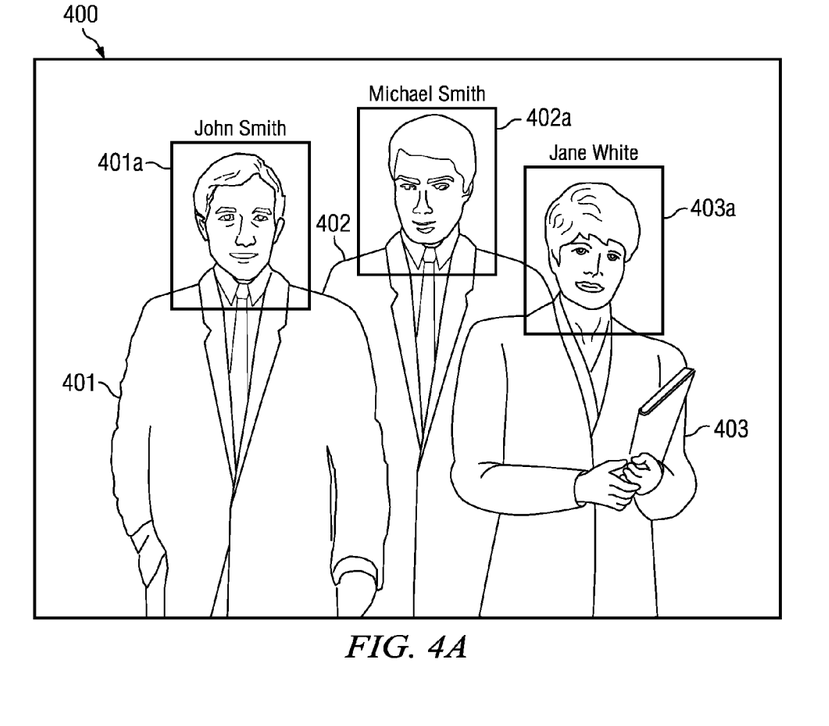
FIG. 4A illustrates an example of a legitimate natively-captured image.

FIG. 4A illustrates an example of a legitimate natively-captured image 400. Image 400 includes, for didactic purposes, three individuals 401, 402, and 403. For each individual, the photo uploader or another user may request to tag any of individuals 401-403. Here, tags for users "John Smith" (401a), "Michael Smith" (402a), and "Jane White" (402c) have been positioned to encompass each of individuals 401-403's faces, respectively.

Figure 4B:
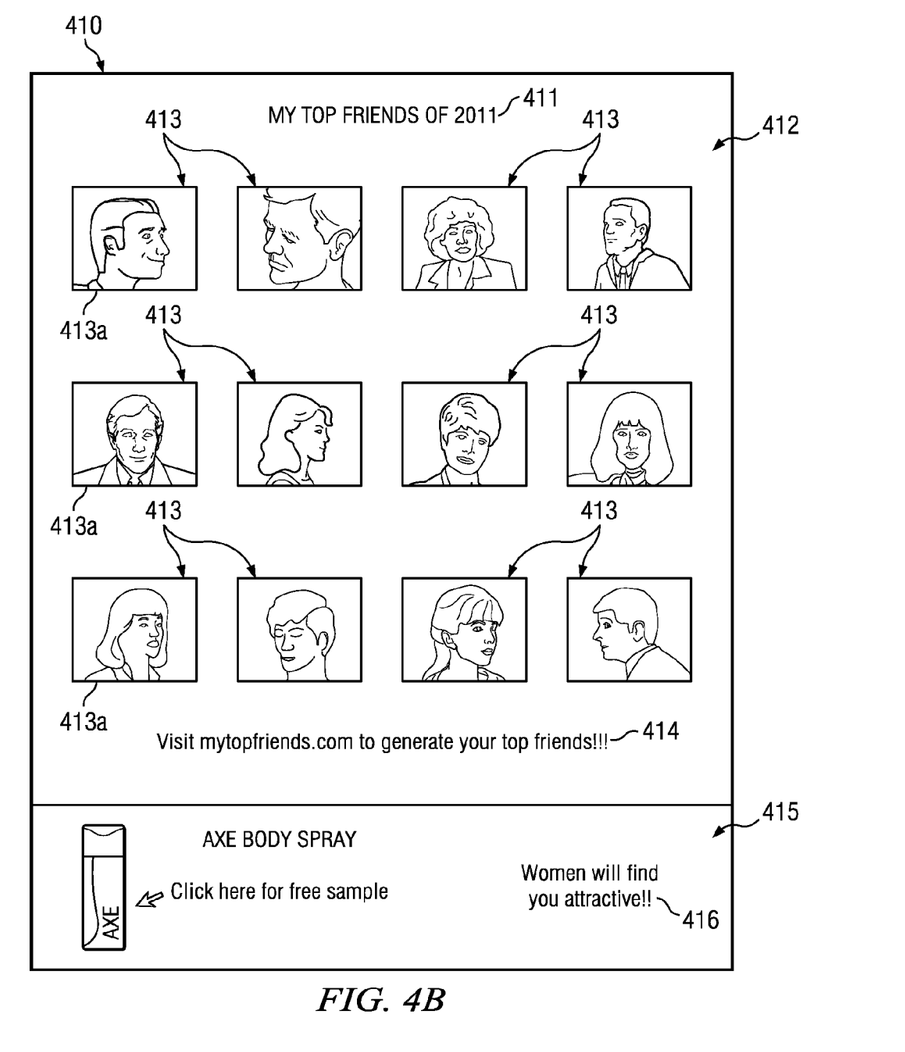
FIG. 4B illustrates an example of an illegitimate non-natively captured image.

FIG. 4B illustrates an example of an illegitimate non-natively captured image 410 detected by photo spam detector module 260. Images of 410 are commonly generated by third-party applications, and are of little or no value to users of the social networking system. In this case, the application "Top Friends" generates image 410, by inserting text 411 ("My Top Friends of 2011") to a background 412, and pulling and displaying an arbitrary number of the profile photos 413 of the friends of the user running the "Top Friends" application. Depending on the implementation, the application may also tag each profile photo 413 with a tag request 413a associated with the user from which profile photo 413 is pulled. Illegitimate image 414 may also include self-promotional text 414, and advertisement 415, which may contain any combination of graphics or text 416.

Photo spam detector module 260, upon analyzing image 400, extracts multiple image features that increase the probability of categorizing image 400 as illegitimate. For example, in particular embodiments, image feature extraction module 301 may detect background 412 as an unnaturally large region of a single color. The probability that image 400 is illegitimate increases if background 412 is of an unnatural color, such as absolute black or white. Even if background 412 comprises a gradient, the linearity of the gradient will be detected and flagged by image feature extraction module 301. In particular embodiments, image feature extraction module 301 also detects the harsh shift between background 412 and advertisement 415. Such shifts rarely occur in natively-captured photos, and as such increase the probability that image 400 is illegitimate.

In particular embodiments, edge detection algorithms may detect the hard, perfectly aliased edges bordering each profile photo 413. In particular embodiments, edge detection algorithms may also note the orientation of the edges around profile pictures 413; i.e., that they are perfectly perpendicular and perfectly oriented with the edges of the image (at 0 and 90 degrees). Perfectly oriented edges, in particular embodiments, increase the probability that the image is illegitimate. OCR module 305 may also detect text 411, 414, and 416, and, based on the detection, probabilistic module 302 may decrease the probability that image 400 is legitimate.

Figure 4C:
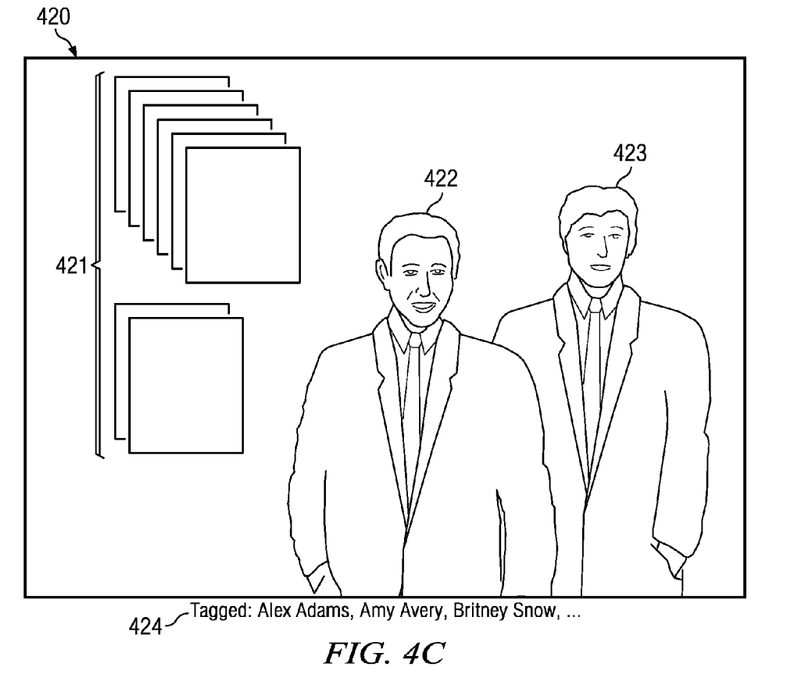
FIG. 4C is an example of a legitimate natively-captured image with photo tag spam.

FIG. 4C illustrates an image 420 that may or may not be legitimate with a number of spammed tag requests 421 and individuals 422 and 423. In this example, tag requests 421 define various overlapping regions of image 420 that do not contain faces of individuals 422 or 423. In particular embodiments, facial recognition module 304, upon failing to detect any faces in tags 421, would mark the tags as spam. In particular embodiments, even if tags 421 were positioned over the faces of individuals 422 and 423, facial recognition module 304 would detect identical faces for more than one tag, and mark those tags as spam. Finally, in particular embodiments, even where each tag 421 tags a different face, tag analyzer module 303 may assess the relationship of the tags via profile database 220. Tag analyzer module may notice that the list 424 of users tagged in photo 420 is arranged in alphabetical order. In particular embodiments, if tags 421 were received within a predetermined period of time from each other, tag analyzer module 303 marks the tags as spam.

Figure 5:
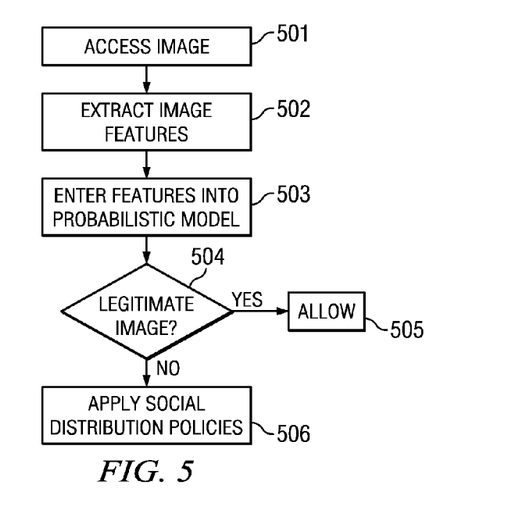
FIG. 5 illustrates an example method of estimating the legitimacy of a photo image.

FIG. 5 is an example method of categorizing images as legitimate or illegitimate in accordance with one embodiment of the invention. At Step 501, photo spam detector 260 accesses an image. In particular embodiments, photo spam detector 260 accesses the image immediately when the image is uploaded to the social networking system. In particular embodiments, photo spam detector 260 accesses the image when a tag request or other action is requested on the image. In particular embodiments, photo spam detector 260 accesses the image at a predetermined interval. This disclosure contemplates any timing of image access.

At Step 502, photo spam detector 260, through image feature extraction module 301, extracts relevant features from the image. Image feature extraction module 301 at step 503 passes the extracted features as inputs to probabilistic model 302. Probabilistic model 302 may calculate a probability score that the image is legitimate or illegitimate based on extracted image features. Alternatively, probabilistic model 302 may classify in two categories, legitimate or illegitimate. Obviously, in such an embodiment, Steps 504-506 are obviated.

At Step 504, photo spam detector 260 compares the output of probabilistic model 302 with a predetermined threshold probability contained in policy module 230. If the probability that the image is illegitimate is lower than the threshold value, the image is classified at Step 505 as a legitimate image. At step 506, if the probability the image is illegitimate exceeds the predetermined threshold, the image is classified as illegitimate, and one or more social distribution policies are applied to the image.

Photo Spam detector 260 may apply any number of social media distribution policies. In particular embodiments, one policy suppresses the distribution of the photo. For example, if a user or application attempts to upload an illegitimate photo, the photo is rejected and cannot be uploaded. In particular embodiments, one policy suppresses notification of the photo. For example, a user may be allowed to upload an illegitimate photo, but it will not appear in any of his or her friends' news feeds, nor on the wall of a user or fan page where the user uploaded the photo. In particular embodiments, one social distribution policy prohibits all actions on an image that has been classified as illegitimate. For example, users may not tag, comment on, or otherwise interact with the photo. In particular embodiments, one policy allows actions on the illegitimate photo, but suppresses notifications of such actions. For example, users may tag an illegitimate photo, but the tags will not show up in any newsfeeds, nor will notifications be sent to the tagged users. In particular embodiments, one policy slows down the typeahead procedure facilitating tagging. For example, in particular embodiments, as a user types the name of another user he or she wishes to tag, a typeahead feature automatically displays a list of users whose username matches the typed string. One social media distribution policy disables this typeahead feature for illegitimate images, increasing the time and effort required to tag the photo.

In particular embodiments, one social media distribution policy is to "spoof" acceptance of the illegitimate image. To the user who uploaded the illegitimate image, the social networking system appears to be functioning completely normally; i.e., the image is successfully uploaded, the user may tag the image, and other users may tag the image. However, the social networking system only displays the image to the uploading user. It is suppressed from the newsfeed of all the user's friends, it does not appear on the wall of a user or place the uploading user uploaded to, and none of the tagging operations generate stories or notifications. Thus the uploading user or application believes the illegitimate image and operations thereon are being distributed, but they are, in reality, suppressed from all other users of the social network.

Figure 6:
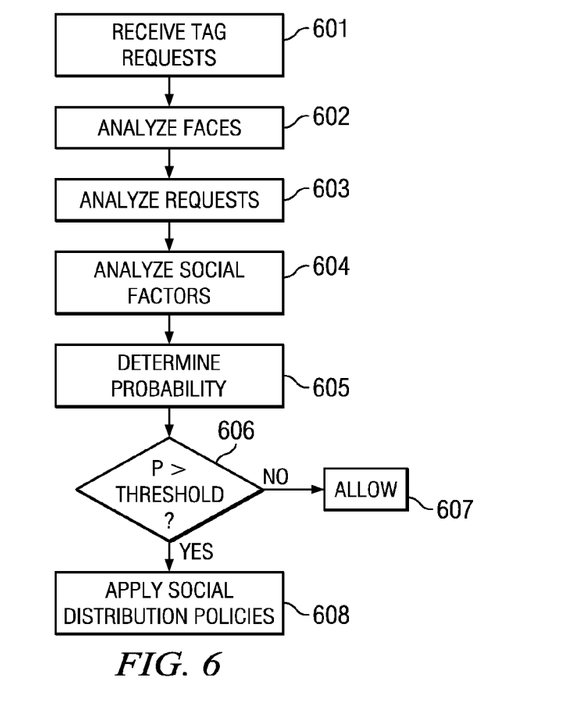
FIG. 6 illustrates an example method of detecting photo tag spam.

FIG. 6 illustrates an example method of detecting and classifying tags as spam in accordance with one embodiment. At Step 601, the social networking system receives one or more requests to tag a given photo. The photo may be classified as legitimate, illegitimate, or unclassified. Upon receiving the tags, photo spam detector 260, via tag analyzer 303, begins analysis of the one or more received tags.

At Step 602, facial recognition module 304 searches the region delineated by each individual tag for a face, as described above. In particular embodiments, facial recognition module 304 utilizes commercially-available face libraries. In particular embodiments, facial recognition module 304 utilizes a face library built from the profile pictures of users of the social network. Facial recognition module searches for tag regions lacking a face, and increases the probability that the tag is spam when a face cannot be detected. In particular embodiments, if facial recognition module 304 detects a face in a region delineated by a tag request, facial recognition module searches if the same face has been tagged in the photo, and, if so, increases the probability that the tag is spam. In particular embodiments, this is achieved through comparing the regions specified by the tags themselves. For example, if only one face is detected in two different tag regions, and the regions cover substantially the same coordinate areas of the image, facial recognition module 304 may assume they have tagged the same individual face twice.

At Step 603, tag analyzer 303 assesses the relationship between the tags themselves. In particular embodiments, tag analyzer 303 determines whether the tags were received within a predetermined period of time from each other, and marks them as spam if they were received below that threshold period. In particular embodiments, tag analyzer 303 determines whether the tags are received in any sequential order, such as in alphabetical order by username. This disclosure contemplates all suitable methods of analyzing the relationship between photo tag requests.

At Step 604, tag analyzer 303 assesses social factors between the users associated with the tags. As described above, tag analyzer may determine that photo tag requests tagging a set of users with low social coefficients between each other are more likely to be spam tags. In particular embodiments, other social factors such as distance, current location, and, if available, if the users were checked-in to disparate locations at the time the photo was taken or uploaded. This disclosure contemplates any method of social factor analysis of the relationship between the users associated with the tag requests to determine whether the tags are spam.

At Step 605, tag analyzer 303 combines the factors determined in 602-605 to determine a probability that the tags are spam. The probability is compared to a predetermined threshold in Step 606 and stored in policy module 230. If the probability is below the threshold, the tags are categorized as legitimate and allowed in Step 607. If they exceed the predetermined threshold, photo spam detector 260 applies one or more social distribution policies at Step 608. Although FIG. 6 depicts steps 602-605 as being performed in a particular sequential order, this disclosure envisions any ordering of steps 602-605. Furthermore, steps 602-605 need not be performed in series; this disclosure envisions all manners of parallel or sequential processing of Steps 602-605.

Photo Spam detector 260 may apply any number of social distribution policies. In particular embodiments, one policy suppresses tagging operations. For example, once tag requests have been classified as spam, they are simply denied. In particular embodiments, one policy allows tagging, but suppresses notifications of such actions. For example, users may tag an illegitimate photo, but notifications of the tags will not show up in any newsfeeds, nor will notifications be sent to the tagged users. In particular embodiments, one policy slows down the typeahead procedure facilitating tagging. For example, in particular embodiments, as a user types the name of another user he or she wishes to tag, a typeahead feature automatically displays a list of users whose username matches the typed string. One social media distribution policy disables this typeahead feature for illegitimate images, increasing the time and effort required to tag the photo.

In particular embodiments, one social media distribution policy is to "spoof" acceptance of the tag requests. For example, the tags appear to be accepted to the tagging user or application, and are displayed on the photo in the view displayed to the tagging user, but are not displayed elsewhere. As a further extension of this "spoofing" policy, if user A tags user B with a spam tag, when user A views "photos of user B", the image containing the spam tag will be displayed to user A, and user A alone. No other user will see the photo containing the spam tag when viewing "photos of user B." Thus, user A has no way of verifying if his spam was distributed.

In particular social networking environments, when a user tags another user in a photo, the tagged user is sent an event notification, and the social networking system displays a story describing the tagging operation in the news feed of all the tagged user's first-degree contacts Spam tags disseminate low-value information or misinformation to users of the social network, thereby degrading their social networking experience. Applying one or more of the social media distribution policies as described above suppresses the distribution of irrelevant or low-value spam, thereby greatly enhancing the social networking experience for users.

Additionally, spammers are often very quick to adapt their spamming methods so as to bypass or circumvent spam detection filters. The "spoofing" mechanism as described above reduces the probability spammers realize their content is suppressed; even if the spammer logs in from another account and realizes that his or her media is suppressed, it is difficult for the spammer to determine what behavior is triggering the application of the social media distribution policies.

Thus, the disclosed methods may detect both images that are illegitimate as well as tags that are illegitimate to prevent distribution of spam or spam-like promotions. The two methods may be run on all images simultaneously, or at the time tag requests are received on a particular image to effectively filter a multitude of spam-like actions. In particular embodiments, the image legitimacy method is applied upon upload, and the tag analysis is performed any time tag requests are received on the image. In this way, all methods of photo tag spam may be detected and suppressed. For example, the image 410 of FIG. 4B could possibly pass the tag spam detection method of FIG. 6, if the tags were received an acceptable duration apart from each other, in no particular order, and the members tagged had a sufficient social relevance coefficient between them. However, image 410 would not pass the image legitimacy test of FIG. 5. Conversely, image 420 of FIG. 4C could pass the image legitimacy test of FIG. 5 if it were a natively-captured image from a camera. However, it would not pass the tag analysis of FIG. 5. Thus the disclosed methods may detect and suppress legitimate images with spam tags, illegitimate images with legitimate tags, as well as illegitimate images with spam tags.

Figure 7:
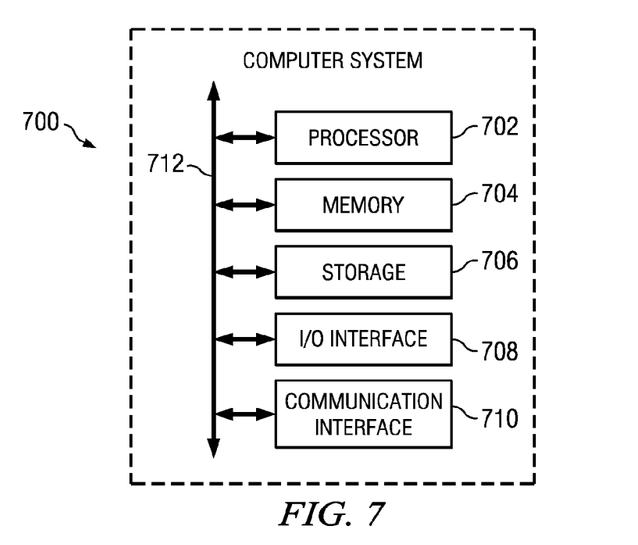
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple datacenters; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 02 to memory 704. Bus 712 may include one or more memory buses, as described below. In particular embodiments, one or more memory management units (MMUs) reside between processor 702 and memory 704 and facilitate accesses to memory 704 requested by processor 702. Although this disclosure describes and illustrates particular memory, this disclosure contemplates any suitable memory.

In particular embodiments, storage 706 includes mass storage for data or instructions. Storage 706 may include removable or non-removable (or fixed) media, where appropriate. Storage 706 may be internal or external to computer system 700, where appropriate. In particular embodiments, storage 706 is non-volatile, solid-state memory. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. Although this disclosure describes and illustrates a particular communication interface, this disclosure contemplates any suitable communication interface.

In particular embodiments, bus 712 includes hardware, software, or both coupling components of computer system 700 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, by one or more computing systems:
   receiving one or more requests to tag one or more respective users in an image, each request defining a region in the image and associating a user of the one or more users with the region;
   determining a social relationship between the one or more users;
   determining a probability that each of the one or more requests constitutes an illegitimate tag based on the social relationship; and
   applying one or more social media distribution policies to one or more of the requests based on the probability.

2. The method of claim 1, further comprising, for each of the one or more requests:
   applying one or more facial recognition algorithms on the region defined in the request; and
   increasing the determined probability if the one or more facial recognition algorithms fails to detect a face in the defined region.

3. The method of claim 2, further comprising, for each of the one or more requests:
   increasing the determined probability if the request defines a region including a face that is associated with the same user associated in a region defined by another request.

4. The method of claim 1, further comprising:
   analyzing a relationship between the one or more requests; and
   adjusting the determined probability based on the analysis.

5. The method of claim 1, further comprising adjusting the probability by decreasing the probability if requests were received in alphabetical order of user names.

6. The method of claim 1, further comprising adjusting the probability by decreasing the probability if the requests were received at a rate above a predetermined threshold.

7. The method of claim 1, further comprising adjusting the probability by decreasing the probability if a coefficient score between the one or more users is below a predetermined threshold.

8. The method of claim 1, wherein one of the social media distribution policies comprises suppressing distribution of the image.

9. The method of claim 1, wherein one of the social media distribution policies comprises suppressing distribution of actions on the image.

* * * * *